United States Patent [19]

Takitani et al.

[11] 4,416,799

[45] Nov. 22, 1983

[54] CATALYTIC COMPONENT FOR POLYMERIZING α-OLEFIN AND METHOD FOR HOMO- OR CO-POLYMERIZATION OF α-OLEFIN

[75] Inventors: Masaru Takitani; Keikichi Baba; Shizuo Tomiyasu, all of Shinnanyo, Japan

[73] Assignee: Toyo Stauffer Chemical Co., Ltd., Tokyo, Japan

[21] Appl. No.: 438,400

[22] Filed: Nov. 1, 1982

Related U.S. Application Data

[63] Continuation of Ser. No. 214,715, Dec. 9, 1980, abandoned.

[30] Foreign Application Priority Data

Dec. 18, 1979 [JP] Japan .................................. 54-165336

[51] Int. Cl.$^3$ ............................................... C08F 4/64
[52] U.S. Cl. .................................. 502/156; 526/125; 526/142; 526/143; 502/172; 502/224
[58] Field of Search .......................... 252/429 B, 441

[56] References Cited

U.S. PATENT DOCUMENTS 4,242,229  12/1980  Fujii et al. ..................... 252/429 B
4,252,670  2/1981  Caunt et al. .................... 252/429 B

FOREIGN PATENT DOCUMENTS 54-76492   6/1979  Japan .
54-123594  9/1979  Japan .
54-133584  10/1979 Japan .
55-131005  10/1980 Japan .
2033409A   5/1980  United Kingdom .

Primary Examiner—Jacqueline V. Howard
Attorney, Agent, or Firm—Armstrong, Nikaido, Marmelstein & Kubovcik

[57] ABSTRACT

An α-olefin polymerizing catalytic component which has a support capable of supporting a large amount of titanium and has the titanium work efficiently for polymerizing the α-olefin; and a method for carrying out homo- or co-polymerization of an α-olefin by using a catalyst system which consists of the catalytic component and an organo-aluminium compound. The catalytic component is obtained basically by allowing an organo-magnesium compound and a carbon tetrahalide to react with each other in the presence of an organic acid ester; by treating a solid product formed through this reaction with an organic compound of phenol; and then by further treating the product with a halogen-containing titanium compound.

19 Claims, No Drawings

CATALYTIC COMPONENT FOR POLYMERIZING α-OLEFIN AND METHOD FOR HOMO- OR CO-POLYMERIZATION OF α-OLEFIN

This is a continuation of application Ser. No. 214,715, filed Dec. 9, 1980, now abandoned.

BACKGROUND OF THE INVENTION

1. Field of the Invention:

This invention relates to a supported catalytic component for α-olefin polymerization which has a greater titanium content therein than the conventional Ziegler type supported catalytic component, highly uniform particle diameter, a high degree of polymerizing activity and high productivity for a stereospecific polymer. The invention also relates to a method for homo- or co-polymerization of an α-olefin in which polymerization is carried out in the presence of a catalyst system which consists of the above stated supported catalytic component and an organo-aluminum compound. More particularly stated, the invention elates to a Ziegler type supported catalytic component which is obtained with an inert hydrocarbon compound employed as solvent and by allowing therein a carbon tetrahalide and an organo-magnesium compound to react with each other in the presence of an organic acid ester to obtain a solid matter; by treating the solid matter with an organic compound of phenol (hereinafter will be called the phenol compound); and then by treating the solid product with a halogen-containing titanium compound. The invention also relates, as mentioned in the foregoing, to a method for homo- or co-polymerization of an α-olefin which is carried out in the presence of a catalyst system consisting of the above stated supported catalytic component and an organo-aluminum compound.

2. Description of the Prior Art:

The conventional catalytic components that are suitable for use in manufacturing a stereospecific α-olefin polymers include a catalytic component obtained by activating through a pulverizing process or the like an eutectic mixture consisting of aluminum chloride and titanium trichloride which is obtained by reducing titanium tetrachloride with metal aluminum in the presence of aluminum chloride; and a catalytic component which is obtained by reducing titanium tetrachloride with an organo-aluminum compound to obtain titanium trichloride and by treating the titanium trichloride with an organic ether compound and titanium tetrachloride to activate. In carrying out polymerization of an α-olefin, the catalytic component is used ordinarily by combining it with an organo-aluminum compound into a catalyst system. An α-olefin polymer obtained by carrying out polymerization in the presence of this catalyst system contains therein several hundred ppm of the residue of the catalyst. Then, a transition metal such as titanium and halogen remaining within the polymer come to accelerate deterioration of the polymer. Therefore, they must be removed as much as possible from the polymer. Hence, a polymer produced in this manner has been washed with an alcohol to remove the residue of the catalyst in the manufacture of the polymer.

In efforts to lower the cost of the manufacture of an α-olefin polymer, there have recently been proposed many kinds of catalytic components that have polymerizing activity in a sufficient degree to permit an α-olefin polymer manufacturing operation to exclude a deashing process that have been necessary for washing and removing a transition metal, such as titanium, from a polymer product. What is aimed at by these catalytic components in such that the transition metal content such as titanium remaining in a polymer produced can be reduced to several ppm or less than that by making the quantity of the polymer produced to one hundred thousand to several hundred thousand parts by weight per unit part by weight of the transition metal such as titanium. Then, this would obviates the necessity of having the deashing process and would contribute to reduction in the cost of manufacture of an α-olefin polymer. Most of them are supported catalytic components of the so-called Ziegler type and are prepared in the following manner:

A magnesium chloride or a magnesium chloride which has undergone some surface treatment is used as support to have titanium tetrachloride supported on the surface thereof. However, in the case of a method where a support which in mainly composed of magnesium chloride is processed in titanium tetrachloride to have titanium supported on the support, it is difficult to enable the support to support titanium if the magnesium chloride is used as it is and a catalytic component thus obtained does not have a sufficient effect on the polymerization of an α-olefin. To solve this problem, it has been considered necessary to have the magnesium chloride surface treated by some suitable method.

Examples of methods for obtaining catalytic components of the above stated type include: A method disclosed by a Japanese patent application laid-open No. 48-16986 in which a complex consisting of titanium tetrachloride and an organic acid ester is mixed with anhydrous magnesium chloride and is pulverized together; and another method disclosed by a Japanese patent application laid-open No. 53-108088 in which anhydrous magnesium chloride, an organic acid ester and silicone oil are pulverized together; and a matter obtained by this pulverization process is treated by an active hydrogen compound, an organic metal compound and titanium tetrachloride.

However, with an α-olefin polymerized by using a catalytic component prepared in accordance with such methods, the productivity for a stereospecific polymer is not satisfactory. Meanwhile, depending upon the polymerizing conditions employed, several hundred of thousand parts by weight of a polymer is sometimes obtainable per unit part by weight of titanium which is a transition metal. However, since the catalytic component contains only 1 to 3% by weight of titanium, if this is calculated in terms of an amount of the polymer produced per unit part by weight of the whole catalytic component, the amount of the polymer produced is only several thousand part by weight. In other words, although the amount of titanium contained in the polymer is not much, there are contained large amounts of magnesium and chlorine. Therefore, it is still necessary to remove halogen while removal of the transition metal such as titanium from the polymer may be no longer necessary. Besides, the amount of magnesium contained in the polymer is also not negligible. This problem is attributable to the fact that the quantity of the transition metal such as titanium supported on the support is small and is normally 1 to 30% by weight of the support. Such being the situation, even where polymerizing activity per unit weight of titanium is high, when this is calculated in terms of the polymerizing activity per unit weight of the catalytic component, the degree of polymerizing activity of the catalytic component is still not high enough to permit omission of the deashing process.

To solve this problem, there has been also proposed a method by a Japanese patent application laid-open No. 49-86482 in which the concentration of halogen is lowered by a support which is used as co-support. However, with a catalytic component prepared in accordance with this method, the weight of a polymer produced per unit weight of the catalytic component is lessened as much as the quantity in which this co-support is used. Therefore, this method fails to solve the problem.

As for a proposition based on a completely different viewpoint, there has been proposed a Ziegler type catalytic component in which a matter which is not magnesium chloride and does not contain halogen at all is used as support. However, this catalytic component is inferior in polymerizing activity and productivity for a stereospecific polymer. Thus, there has not been proposed any catalytic component that is considered useful for industrial applications.

Meanwhile, the inventors of the present invention came to form a conception that the above stated shortcomings of the prior art could be eliminated by increasing the quantity of titanium that can be supported on a support and by giving some treatment that renders the whole of the supported titanium effectively operative. They have strenuously conducted studies to eventually discover that an α-olefin polymerizing catalytic component which has a great quantity of titanium supported on a support to have a high rate of polymer formation per unit weight of titanium and also per unit of the catalytic component and which has a high degree of productivity for a stereospecific polymer can be obtained by allowing an organo-magnesium compound and carbon tetrahalide to react with each other in an inert organic solvent in the presence of an organic acid ester to obtain a solid product of reaction; they by treating this solid reaction product with a phenol compound; and further by treating it with a halogen containing titanium compound. The present invention has resulted from this discovery.

SUMMARY OF THE INVENTION

It is a general object of the invention to provide a catalytic component for α-olefin polymerization which eliminates the above stated shortcomings of the catalytic components obtained by the methods of the prior art. To attain this object, it is essential for the present invention to have an organo-magnesium compound and carbon tetrahalide react with each other and to have this reaction take place in the presence of an organic acid ester. The object of the invention is hardly attainable if the carbon tetrahalide is replaced, for example, with a silicon tetrahalide or if the reaction is allowed to take place in the absence of the organic acid ester.

It is well known that teatment of anhydrous magnesium chloride with titanium tetrachloride does not allow much titanium to be supported on the surface of the magnesium chloride. Recently, therefore, there have been proposed many methods for increasing the supported quantity of titanium. Such proposed methods, for example, include methods proposed by Japanese patent applications laid-open No. 50-126590 and No. 52-100596. In accordance with these proposed methods, anhydrous magnesium chloride and an organic acid ester are pulverized together to alter magnesium chloride in quality to enable it to support titanium tetrachloride. Analysis of a matter obtained by pulverizing anhydrous magnesium chloride and the organic acid ester by means of infrated absorption spectrum shows a large absorption band which seems to be attributable to a functional group such as a carboxyl group. It is believed that the titanium tetrachloride is supported on the pulverized matter because of the functional group. Whereas, in the case of a reaction product obtained from a reaction of an organo-magnesium compound with carbon tetrachloride carried out in the presence of an organic acid ester is capable of supporting a large quantity of titanium tetrachloride despite of the fact that the absorption bands of this reaction product are identical with those of anhydrous magnesium chloride. This is a marvellous fact which has not been discovered by the prior art. However, to obtain such a product, it is essential that the reaction of the organo-magnesium compound and the carbon tetrahalide must be carried out in the presence of an organic acid ester. It is hardly possible to obtain such a product by carrying out the reaction without the presence of an organic acid ester there.

Compared with the conventional supported catalytic component, the supported catalytic component obtained in accordance with the present invention is capable of supporting thereon as much as 15 to 32% by weight of titanium tetrahalide; has highly uniform particle diameter; and has an excellent fluidity. Therefore, the catalytic component provides case of handling thereof during the manufacture thereof and facilitates preparation of a catalyst during a polymerization operation.

Prior methods that use an organo-magnesium compound as material for a supported catalytic component include, among others, a method disclosed by a Japanese patent application laid-open No. 53-4309 in which an organo-magnesium compound is oxidized with a silicon compound such as silicon tetrachloride and is then treated with titanium tetrachloride; a method disclosed by a Japanese patent application laid-open No. 54-66392 in which an organo-magnesium compound is directly oxidized with titanium tetrachloride and, at the same time, is allowed to support the titanium component thereof; and another method disclosed by a Japanese patent application laid-open No. 53-57195 in which a complex consisting of an organo-magnesium compound and an organo-aluminum compound is oxidized with a tertiary alkyl halide compound and then is treated with titanium tetrachloride to let the complex support the titanium component thereof. However, the catalytic components obtained by these methods are either incapable of supporting a sufficient amount of titanium or, when used for polymerization of an α-olefin, has low polymerizing activity, low productivity for a stereospecific polymer. Thus, with these catalytic components employed, it has been impossible to omit the processes of removing the residue of the catalyst and washing a polymer produced in the manufacture of the polymer.

Taking aliphatic carboxylic acid esters and aromatic carboxylic acid esters as examples, the organic acid ester to be used in accordance with the invention is selected out of the group of saturated aliphatic primary alkyl esters consisting of methyl formate, ethyl, acetate, n-amyl acetate, 2-ethylhexyl acetate, n-butyl formate, ethyl butyrate, ethyl valerate, etc. out of the group of saturated aliphatic alkenyls such as vinyl acetate, allyl acetate, etc.; out of the group of unsaturated alihatic primary alkyl esters such as methyl acrylate, methyl methacrylate, n-butyl crotonate etc.; out of the group of poly-carboxylic acid esters such as 2-ethyl hexyl adipate, etc.; out of the group of lactones such as γ-butyro lactone, δ-valero lactone, etc.; out of the group of benzoic acid primary alkyl esters such as methyl benzoate, ethyl benzoate, n-propyl benzoate, n- or iso-butyl benzoate, n- or iso-amyl benzoate, n-hexyl benzoate, n-octyl benzoate, 2-ethylhexyl benzoate, etc.; out of the group of toluic acid primary alkyl esters such as methyl toluate, ethyl toluate, n- or iso-butyl toluate, 2-ethylhexyl toluate; out of the group of anisic acid primary alkyl esters such as methyl anisate, ethyl anisate, n-propyl anisate, etc.; out of the group of naphthoic acid primary alkyl esters such as methyl naphthoate ethyl naphthoate, n-propyl naphthoate, n-butyl naphthoate, 2-ethylhexyl naphthoate, etc.; out of the group of aromatic lactones such as cumarin, phthalide, etc.; and so on. Of these esters, the organic acid ester to be used in accordance with the invention is preferably selected out of the group consisting of methyl benzoate, ethyl benzoate, methyl toluate, ethyl toluate, methyl anisate ethyl anisate, methyl naphthoate and ethyl naphthoate and more preferably selected out of the group consisting of methyl benzoate, ethyl benzoate, methyl anisate and ethyl anisate.

The organo-magnesium compound which is usable in accordance with the invention and which is expressed by a generic formula RMgR', wherein R and R' represent either the same or different hydrocarbon groups each having 1 to 10 carbon atoms, is selected, for example, out of the group consisting of dimethyl magnesium, divinyl magnesium, di-ethyl magnesium, ethyl isopropyl magnesium, di-n-propyl magnesium, diisopropyl magnesium, dibutenyl magnesium, di-n-butyl magnesium, n-butyl ethyl magnesium, n-butyl sec-butyl magnesium, di-t-butyl magnesium, di-sec-butyl magnesium, n-butyl t-butyl magnesium, dicyclo pentadienyl magnesium, diphebyl magnesium, di-n-hexyl magnesium, n-hexyl ethyl magnesium, bis (methyl cyclo pentadienyl) magnesium, di-hexynyl magnesium, dicyclo-hexyl magnesium, dibenzyl magnesium, bis (phenyl-ethynyl) magnesium, dicinnamyl magnesium, n-octyl ethyl magnesium, di-n-octyl magnesium, di-n-decyl magnesium, etc. Of these organo-magnesium compounds, the use of n-butyl ethyl magnesium is particularly advantageous.

The carbon tetrahalide to be used in accordance with the invention is selected out of the group consisting of carbon tetrafluoride, carbon tetrachloride, carbon tetrabromide and carbon tetraiodide. Of these carbon tetrahalides, however, the use of carbon tetrachloride is preferable.

In accordance with the invention, the reaction is carried out in an inert organic solvent. The organic solvent is selected, for example, out of the group consisting of aliphatic hydrocarbons such as hexane, heptane, kerosine, etc.; alicyclic hydrocarbons such as cyclohexane, etc.; aromatic hydrocarbons such as benzene, toluene, xylene, etc.; and halogenated hydrocarbons that do not react with an organo-magnesium compound such as chlorobenzene, etc.

The phenol compound to be used in accordance with the invention is selected, for example, out of the group consisting of phenyl, cresol, chloro phenol, bromo phenol, 2,4,6-trichloro phenol, 2,4,6-tribromo phenol, nitro phenol, 2,4-dinitro phenol, guaiacol, anol, eugenol, isoeugenol, saligenin, carvacrol, thymol, hydroxyacetophenone, hydroxydiphenyl, cyclohexyl phenol, catechol, resorcinol, hydroquinone, phloroglucinol, amino phenol, etc. However, it is preferable to use phenol or cresol.

The halogen containing titanium compound to be used in accordance with the invention is selected out of the group consisting of titanium tetrachloride, titanium tetrabromide and titanium tetraiodide. Of these compounds, it is preferable to use titanium tetrachloride.

The organo-aluminum compound usable in accordance with the invention is a compound expressed by a generic formula of $AlR_nX_{3-n}$ wherein R represents a hydrocarbon group of carbon number 1 to 20; X a hydrogen atom or halogen atom selected out of fluorine, chlorine, bromine and iodine; and n a real number of $0 < n \leq 3$. This compound is selected out of the group consisting of trimethyl aluminum, tryethyl aluminum, tri-n-propyl aluminum, tri-n-butyl aluminum, triisobutyl aluminum, tri-n-hexyl aluminum, tri-2-methylpentyl aluminum, tri-n-octyl aluminum, tri-n-decyl aluminum, diethyl aluminum chloride, di-n-propyl aluminum chloride, diisobutyl aluminum chloride, methyl aluminum sesqui-chloride, ethyl aluminum sesqui-chloride, ethyl aluminum dichloride, isobutyl aluminum dichloride, diethyl aluminum fluoride, diethyl aluminum bromide, diethyl aluminum iodide, diethyl aluminum hydride, diisobutyl aluminum hydride, isoprenyl aluminum, etc.

The above and further objects and features of the invention will be apparent from the following detailed description thereof:

DETAILED DESCRIPTION OF THE INVENTION:

The catalytic component of the present invention is manufactured, for example, in the following manner:

A solution is prepared by dissolving an organic acid ester into an inert organic solvent. Then, an organo-magnesium compound and a carbon tetrahalide are mixed and allowed to react within the solution. In mixing them, either the carbon tetrahalide is added to the organo-magnesium compound or the latter is added to the former or the two are simultaneously added to the solution and mixed there. However, for the convenience in handling the organo-magnesium compound, it is preferable to have the organic acid ester and the organo-magnesium compound dissolved in the inert organic solvent and then to add and mix the carbon tetrahalide in the inert organic solvent with the carbon tetrahalide either diluted or not diluted by an inert solvent before it is added.

Although it depend upon the structure of the organo-magnesium compound expressed by the generic formula of RMgP' and also depend upon the number of the carbon atoms in the R and R' of the formula, the concentration of the organo-magnesium compound in the inert organic solvent is arranged to be not exceeding 50 wt. %, preferably not exceeding 45 wt. % and more preferably not exceeding 40 wt. %. When the concentration of the organo-magnesium compound in the inert organic solvent exceeds 50 wt. %, the viscosity of the inert organic solvent which has the organo-magnesium compound dissolved therein increases too much for ease of operation and, depending on the reaction conditions, tends to cause a side reaction. Although there is no particular limitation for the lower limit of the concentration, for adequate productivity, it is preferable to have the concentration at least 0.01 wt. %.

The quantity of the organic acid ester is 0.001 to 5 mol for 1 mol of the organo-magnesium compound, preferably 0.005 to 3 mol and more preferably 0.01 to 3 mol.

The addition quantity of the organic acid ester is interrelated with the quantity of titanium to be supported on the support. The quantity of the supported titanium tends to increase according as to addition quantity of the organic acid ester increases. However, addition quantity of the organic acid ester exceeding 5 mol gives no tangible increse in the effect attainable by the addition of the organic acid ester. Conversely, in addition quantity thereof less than 0.01 mol the supported quantity of titanium is too small and greatly degrades the properties of the catalytic component for polymerization of an α-olefin.

In this invention, it is an indispensable condition that the reaction between the organic magnesium compound and carbon tetrachloride should be carried out at presence of the organic ester. The difference between the solid product obtained by the reaction of the organic magnesium compound with carbon tetrachloride at presence of the organic ester, and the solid product obtained by further post-treatment of the solid product with the organic ester which was obtained by the reaction of the organic magnesium compound with carbon tetrachloride at absence of the organic ester was clearly demonstrated by the analysis of infrared rays absorption spectrum.

In other words, the former solid product according as this invention has only the same spectrum band as the ordinary anhydrous magnesium chloride, but a large absorption band which is seemed to arise basically from functional groups of carboxylic radical etc. was found in the latter case, and then it is believed that titanium tetrachloride may be supported, being based on the said functional groups.

However, a large amount of titanium tetrachloride can be supported in this invention, in spite of the fact that it does not have such a spectrum band.

With the organo-magnesium compound and the carbon tetrahalide allowed to react in the presence of the organic acid ester in the inert organic solvent, there takes place a unique phenomenon. Now, let us explain this with explanation limited by way of example to a case where the reaction is carried out by adding the carbon tetrahalide to an inert organic solvent which has the organic acid ester and the organo-magnesium compound dissolved therein. When, less than 1 mol of the organic acid ester is added for 1 mol of the organo-magnesium compound, addition of carbon tetrahalide gives a desired solid product in the form of a precipitate. Whereas, when the organic acid ester is added in quantity exceeding 1 mol for 1 mol of the organo-magnesium compound, the addition of the carbon tetrahalide does not give such a precipitate. In this case, in order to obtain the desired solid product, the organo-magnesium compound must be added after the whole quantity of the carbon tetrahalide is added. This seems to be caused by that a precipitate which mainly consists of halogenated magnesium dissolves in the organic solvent in a state of forming a complex with the organic acid ester. However, the object of the present invention is attainable by using either of the solid products obtained in the above stated different manners.

The carbon tetrahalide is used for the purpose of replacing the hydrocarbon group of the organo-magnesium compound with halogen atoms and must be used in quantity 0.01 to 10 mol for 1 mol of the hydrocarbon group of the organo-magnesium compound, preferably 0.05 to 5 mol and more preferably 0.1 to 3 mol.

There is no particular limitation to the temperature of the reaction. However, the reaction takes place vigorously at a high temperture. Therefore, it is preferable to have the reaction proceed at a low temperture at which the velocity of reaction is not too slow. In view of this, the reaction temperature may be set at a value between −50° and 100° C., preferably between −30° and 80° C. and more preferably between −20° and 50° C. Further, to ensure completion of the reaction, it is preferably to keep the temperature unchanged after completion of addition of the carbon tetrahalide and to have a stirring and mixing operation continue under that condition over a period of 0.1 to 10 hours, or to raise the temperature up to 50° C. or thereabout after completion of addition of the carbon tetrahalide, though that depends on the reaction temperature.

The treatment of the solid product which is obtained through the above stated rection with the phenol compound is preferably carried out in an inert organic solvent such as hexane, heptane, kerosine, cyclohexane, benzene, toluene, cyclobenzene, etc.

This treatment is normally carried out by having the solid product suspended in the inert organic solvent and, after that, by adding the phenol compound. There is no particular limitation to the length of time over which this treatment is to be carried out, because it varies with the temperature at the time of treatment and the phenol compound employed. However, a preferred length of time for this treatment is between 0.1 to 10 hours. A length of treatment time less than 0.1 hour does not give the effect that is obtainable from the treatment carried out with the phenol compound. On the other hand, treatment over a length of time exceeding 10 hours gives no particular increase in the effect obtainable. Meanwhile, there is no particular limitation also to the temperature at which the treatment is to be carried out. However, if the phenol compound in use should remain in a solid state, a long period of time would be required and then the phenol compound would be stuck to or adsorbed by the surface of the solid product to make subsequent processes difficult. In such a case, the capability of the product as catalyst also would be degraded. To avoid such, therefore, the treatment must be carried out a temperature above the melting point of the phenol compound used.

The quantity of the phenol compound to be used is normally 0.01 to 10 mol for one atom of magnesium of the solid product, preferably 0.05 to 3 mol and more preferably 0.1 to 1 mol. As for mixing the phenol compound, it may be added as it is. However, the phenol compound may be diluted to 1 to 99% by volume with an inert organic solvent before addition. The effect of the treatment with the phenol compound appears mainly in polymerizing activity and productivity for a stereospecific polymer when the supported catalytic component is used for polymerizing an α-olefin. In case where the supported catalytic component is obtained without the treatment, the polymerizing activity and the productivity for a stereospecific polymer tend to be low even if great quantity of titanium is supported on the support, after the treatment with the phenol compound, the treated solid may be treated with organoaluminum compounds.

The further treatment of the above stated treated product with titanium tetrahalide can be carried out in accordance with a known method. For example, the treated product is allowed to be suspended either in an inert organic solvent in which titanium tetrahalide is dissolved or in titanium tetrahalide. For this further treatment, it is preferable that the concentration of titanium tetrahalide is arranged to be as high as possible. It is possible to have the concomitance of a known electron donor there. The quantity in which the titanium tetrahalide is to be used for the treatment is at least 0.01 mol for 1 mol of magnesium contained in the treated product, preferably more than 1.0 mol and more preferably more than 10 mol. The used quantity less than 0.01 mol of the titanium tetrahalide results in small titanium supporting quantity and makes the supported catalytic component thus obtained, hardly usable for polymerization of an α-olefin. The treatment is normally carried out at a temperature value between normal temperature and 150° C. and over a period between 10 minutes and 10 hours. After the treatment, solid-liquid separation is carried out by decantation or filtration. Further, unreacted titanium tetrahalide sticking to the surface of the solid product thus obtained is removed by washing with some suitable inert organic solvent such as hexane, heptane, kerosine, cyclohexane, benzene, toluene, xylene, or the like. With the unreacted $TiCl_4$ thus removed, a supported catalytic component is obtained. The supported catalytic component is dried under reduced pressure or it may be preserved in a state of being suspended in the above stated inert organic solvent.

It is a feature of the supported catalytic component obtained in accordance with the present invention that, compared with the conventional supported catalytic component, the titanium content of the catalytic component is higher; the particle diameter thereof is more uniform; and the fluidity thereof is better.

The titanium catalytic component of the invention is usable in combination with an organo-aluminum compound for homo- or co-polymerization of an α-olefin. Further, if so desired, the polymerization may be carried out with concomitance of a known electron donor compound. For the homo- or co-polymerization of an α-olefin, the organo-aluminum compound to be used in combination with the supported catalytic component is a component which is similar to the organo-aluminum compound usable for preparation of a supported catalytic component. The quantity in which the organo-aluminum compound is to be added is such that: With the quantity calculated in terms of the aluminum atom in the organo-aluminum compound per titanium atom contained in the titanium catalytic component, the molar ratio Al/Ti is preferably 1-1000.

As for the above stated electron donor compound usable for polymerization, it is possible to use an organic acid ester, etc. for that purpose. The quantity in which the electron donor compound is to be used for that purpose is 0.01 to 2.0 mol for 1 mol of the organo-aluminum compound and preferably 0.05 to 1.0 mol.

the polymerization may be carried out by a suspension polymerization process in which an inert hydrocarbon selected out of the group consisting of aromatic hydrocarbon compounds such as benzene, toluene, xylene, etc., aliphatic hydrocarbon compounds such as hexane, heptane, octane, etc. and alicyclic hydrocarbon compounds such as cyclohexane, cycloheptane, etc. is employed as solvent; a liquid phase polymerization process in which a liquefied monomer is employed as solvent; and a gas phase polymerization process in which polymerization is carried out in a vapor phase of a monomer. The polymerization operation can be carried out either in a continuous operation mode or in a batch operation mode.

The polymerization temperature is set at a temperature between 0° and 200° C. and preferably between 40° and 100° C. The polymerization pressure is set at a value between normal pressure and 100 atm and preferably between normal pressure and 50 atm.

the α-olefin to be polymerized by using the invented titanium supporting catalytic component is an organic compound expressed by a generic formula of $CH_2=CHR$ in which R represents hydrogen or a hydrocarbon group having 1 to 6 carbon atoms. Such organic compounds include, for example, ethylene, propylene, butene-1, 4-methyl pentene-1, hexene-1, styrene, etc. They can be not only subjected to a homopolymerizing process but also can be subjected to a co-polymerizing process. The molecular weight of the polymer is adjustable by a conventional known method carried out with hydrogen or diethyl zinc used.

The following examples are intended to illustrate the details of the invention and not to be construed to limit the scope of the invention. In these examples, symbols are used to indicate polymerizing activity (P), a heptane insoluble matter (H.I.) and an isotactic index (I.I.). The definition of these symbols are as shown below:

P: The weight (g-pp/g-cata) of a solid polymer formed per g of the titanium catalytic component usesd.

$$H.I.: \frac{\text{Weight of n-heptane insoluble polymer}}{\text{Weight of solid polymer}} \times 100(\%)$$

$$I.I.: \frac{\text{Weight of n-heptane insoluble polymer}}{\text{Weight of total polymer formed}} \times 100(\%)$$

EXAMPLES 1–3 AND COMPARISON EXAMPLES 1–6

Preparation of the Titanium Supporting Catalytic Component

First, 161 ml of a heptane solution of n-butyl ethyl magnesium, manufactured by Texas Alkyls Inc. of U.S.A. called by the trade name of MAGALA BEM, concentration 0.652 mol/liter, was put in a 500 ml, four necked flask. The temperature of the solution was adjusted to 80° C. When the temperature became 80° C., a predetermined quantity of an organic acid ester was gradually dropped with stirring. Next, 100 ml of heptane in which a predetermined quantity of carbon tetrahalide or a halide had been dissolved was placed in a dropping funnel and was then dropped into the above stated flask with stirring at 80° C. After completion of this dropping process, stirring was continuously performed for 2 more hours at 80° C. for ripening.

A solid product which was thus formed was filtrated while it was hot and then was washed 5 times with 100 ml of hexane. The solid product was then dried under a vacuum at normal temperature to obtain a support.

Then, 5 g of the support thus obtained was put in a 500 ml, four-necked flask and was allowed to be suspended in 200 ml of heptane there. Following this, the temperature of the inside of the flask was raised up to 80° C. Then, 100 ml of heptane containing therein a predetermined quantity of a phenol compound was placed in a dropping funnel. The phenol compound containing heptane was dropped into the flask with stirring at 80° C. After completion of dropping, a reaction was allowed to proceed with stirring further carried out for 2 more hours at 80° C.

The solid product which was thus treated with the phenol compound was filtrated while it is still hot; washed 5 times with 100 ml of hexane; and vacuum dried at normal temperature to obtain a phenol compound treated solid matter.

the whole quantity of the above stated phenol compound treated matter was put into a 500 ml, four-necked flask and was allowed to be suspended in 200 ml of heptane. The temperature was raised up to 80° C. Following this, 100 ml of heptane in which 30 ml of TiCl$_4$ had been dissolved was placed in a dropping funnel. The solution of TiCl$_4$ was then dropped into the flask with stirring at 80° C. After dropping, a reaction was allowed to proceed there with stirring further carried out over a period of 2 hours. The solid product which orated to dryness to recover an atactic polymer of low molecular weight dissolved in the polymerization solution.

The solid polymer thus obtained was subjected to an extraction process which was carried out with boiling n-heptane over a period of 24 hours to recover an atactic polymer. The results of polymerization was as shown in Table 2.

Polymerization (b)

Polymerization of propylene was carried out in the same manner as in the above mentioned Polymerization (a) with the exception of that the use of 0.5 ml of triethyl aluminum was replaced with the use of 0.5 ml of triethyl aluminum and 0.206 ml of diethyl aluminum chloride. The results of Polymerization (b) were as shown also in Table 2.

TABLE 1

|  | Organo-magnesium compound | Organic acid ester (ml) | Carbon tetra-halide or halide | Phenol compound | Titanium content (wt %) |
|---|---|---|---|---|---|
| Example 1 | n-butylethyl magnesium | ethyl benzoate 2.0 | Carbon tetrachloride 25.2 ml | p-cresol 2.5 g | 7.86 |
| Comparison Example 1 | n-butylethyl magnesium | — | Carbon tetrachloride 25.2 ml | — | 1.12 |
| Comparison Example 2 | n-butylethyl magnesium | — | Carbon tetrachloride 25.2 ml | p-cresol 2.5 g | 1.52 |
| Comparison Example 3 | n-butylethyl magnesium | — | Carbon tetrachloride 25.2 ml | ethyl benzoate 2.0 ml | 1.64 |
| Comparison Example 4 | n-butylethyl magnesium | ethyl benzoate 2.0 | Carbon tetrachloride 25.2 ml | — | 6.77 |
| Comparison Example 5 | n-butylethyl magnesium | ethyl benzoate 2.0 | Silicon tetrachloride 29.8 ml | p-cresol 2.5 g | 3.29 |
| Comparison Example 6 | n-butylethyl magnesium | ethyl benzoate 2.0 | Trichlorosilane 2.5 g | p-cresol 2.5 g | 3.10 |
| Example 2 | n-butylethyl magnesium | ethyl p-anisate 2.2 | Carbon tetrachloride 25.2 ml | p-cresol 2.5 g | 7.48 |
| Example 3 | n-butylethyl magnesium | Methyl benzoate 1.7 | Carbon tetrachloride 25.2 ml | p-cresol 2.5 g | 7.34 | was thus treated with TiCl$_4$ was filtrated while it was still hot; washed 5 times with 100 ml of hexane; and vacuum dried at normal temperature to obtain a titanium supporting catalytic component. The titanium content of the supported catalytic component was as shown in Table 1.

Polymerization (a)

The inside of a 1 liter flask was replaced with dry nitrogen. Then, 400 ml of n-heptane, 0.5 ml of triethyl aluminum and 0.14 ml of ethyl p-anisate were arranged to be suspended within the flask. Meanwhile, 0.1 g of the titanium supporting catalytic component which had been obtained in the above stated manner was put in the flask. The flask was heated to raise the inside temperature thereof up to 70° C. Under this condition, propylene was introduced into the flask up to pressure of 2 kg/cm$^2$G. Following this, the inside of the flask was stirred by vibration. A polymerization reaction was considered started by this vibration process. The pressure of the propylene was kept at 2 kg/cm$^2$ throughout the process of polymerization, which was carried out over a period of 2.5 hours. After 2.5 hours, stirring by vibration was stopped; the propylene gas was stopped from being supplied into the flask; and the propylene gas remaining within the flask was discharged to the outside of the reaction system. Then, the residual catalyst was decomposed by a methanol-isopropanol mixture solution. Then, a polymer product thus formed was separated by filtration and vacuum dried to obtain a solid polymer. On the other hand, the filtrate was evap-

EXAMPLE 4

Preparation of Titanium Supporting Catalytic Component

First, 161 ml of a heptane solution of n-butyl-ethyl magnesium used in Examples 1–3 and Comparison Examples 1–6 was put in a 300 ml, four-necked flask and the temperature of the solution was cooled down to 0° C. When the temperature reached became 0° C., 2.0 ml of ethyl benzoate was gradually dropped into the solution with stirring. Next, 75 ml of heptane in which 25.2 ml of carbon tetrachloride was dissolved therein was placed in a dropping funnel. Then, the carbon tetrachloride solution was dropped into the flask with stirring at 0° C. After dropping, the temperature was allowed to rise without heating up to room temperature. The solution was then kept at room temperature with stirring for 1.5 hours. Following that, the temperature was raised up to 80° C. and stirring was carried on at that temperature over a period of 2 hours for ripening.

A solid product which was thus formed was filtrated and washed 5 times with 100 ml of hexane. The washed product was vacuum dried at normal temperature to obtain a support.

Then, 5 g of the support was placed in a 300 ml of four-necked flask and was arranged to be suspended in 100 ml of heptane there. Meanwhile, 100 ml of heptane containing 2.5 g of p-cresol was placed in a dropping funnel. Then, the p-cresol solution was dropped into the flask with stirring at room temperature. After dropping, temperature was raised up to 80° C. and a reaction was allowed to proceed at that temperature with stirring over a period of 2 hours. The solid product which was thus treated with p-cresol was filtrated; washed 5 times with 100 ml of hexane; and vacuum dried at normal temperature to obtain a phenol compound treated solid product.

The whole quantity of the treated solid product was placed in a 100 ml, four-necked flask. Then, 80 ml of TiCl$_4$ was added to the solid product. After that, the temperature was raised up to 140° C. and a reaction was allowed to proceed with stirring at 140° C. over a period of 2 hours. The TiCl$_4$ treated solid product was then filtrated; washed 5 times with 100 ml of hexane; and vacuum dried at normal temperature to obtain a titanium supporting catalytic component. The titanium content of the supported component was 8.04 wt. %.

Polymerization (c)

Polymerization of propylene was carried out in the same manner as the Polymerization (a) of Examples 1-3 and Comparison Examples 1-6 with the exception of that, in place of 0.5 ml of triethyl aluminum which was used as the organo-aluminum compound in Polymerization (a), 0.3 ml of triethyl aluminum and 0.2 ml of diethyl aluminum chloride were used in this case. The results of polymerization thus carried out were as shown in Table 2.

COMPARISON EXAMPLE 7

Preparation of the Titanium Supporting Catalytic Component

First, 10 g of anhydrous MgCl$_2$ was put into a 300 ml, four-necked flask and was arranged to be suspended in 260 ml of heptane there. The temperature of the solution thus prepared was adjusted to 0° C. When the temperature reached 0° C., 2.0 ml of ethyl benzoate was gradually dropped into the solution with stirring. After dropping, the temperature was allowed to rise up to room temperature without heating. The solution was stirred in room temperature for a period of 1.5 hours. The temperature of the solution was then raised up to 80° C. to have a reaction proceed under a stirring operation.

A reaction product thus obtained was filtrated and washed 5 times with 100 ml of hexane. The washed product was vacuum dried at normal temperature to obtain a solid product.

Following this, treatment with p-cresol was carried out in the same manner as in Example 4. Then, in the last piece, treatment with TiCl$_4$ was carried out also in the same manner as in Example 4 to obtain a titanium supporting catalytic component. The titanium content of the supported catalytic component thus obtained was 2.31 wt. %.

Polymerization (c)

Polymerization of propylene was carried out in exactly the same manner as in Example 4. The results of polymerization thus carried out were as shown in Table 2.

COMPARISON EXAMPLE 8

Preparation of the Titanium Supporting Catalytic Component

A titanium supporting catalytic component was prepared in the same manner as in Comparison Example 7 with the exception of that, in place of the use of 10 g of anhydrous magnesium chloride, 10 g of anhydrous magnesium benzoate which was obtained by drying a commercially available Mg (C$_6$H$_5$COO)$_2$.3H$_2$O at 110° C. for 3 hours was used. The titanium content of the supported catalytic component thus obtained was nothing more than a trace.

Polymerization (c)

Polymerization of propylene was carried out in exactly the same manner as in Example 4. The results of the polymerization were as shown in Table 2.

EXAMPLE 5

Preparation of the Titanium Supporting Catalytic Component

In the same manner as in Example 4, 161 ml of a heptane solution of n-butyl ethyl magnesium was put into a 300 ml, four-necked flask. The temperature of the solution was cooled down to 0° C. When the temperature reached 0° C., 20 ml of ethyl benzoate was gradually dropped into the solution with stirring. Following this, 75 ml of heptane having 25.2 ml of carbon tetrachloride dissolved therein was put in a dropping funnel. Then, this solution of carbon tetrachloride was dropped also into the flask with stirring at 0° C. After completion of dropping, the temperature was kept at 0° C. for 1 hour with stirring. The temperature of the solution inside the flask was then allowed to rise up to room temperature without heating. When the temperature reached room temperature, it was raised by heating up a 80° C. and kept at that value with stirring over a period of 2 hours. A precipitate which was produced in the solution was dissolved by this heating process. Next, the solution was cooled down to 2° C. and 50 ml of n-butyl ethyl magnesium was added thereto by dropping. After dropping, the solution was heated up to 80° C. and a solid matter formed therein was allowed to ripe over a period of 1 hour with stirring.

A solid product thus obtained was filtrated; washed 5 times with 100 ml of hexane; and vacuum dried at normal temperature to obtain a support.

Then, 6.2 of this support was placed in a 300 ml, four-necked flask and was arranged to be suspended in 100 ml of heptane. Meanwhile, 100 ml of heptane which contained 2.5 g of p-cresol was put in a dropping funnel. This p-cresol solution was dropped into the flask with stirring at room temperature. After dropping, the temperature was raised up to 80° C. A reaction was allowed to proceed at this temperature with stirring over a period of 2 hours.

The solid product which was thus treated with p-cresol was filtrated; washed 5 times with 100 ml of hexane; and vacuum dried at normal temperature to obtain a phenol compound treated solid product.

The whole quantity of the treated solid product was put in a 100 ml, four-necked flask and 80 ml of TiCl$_4$ was added thereto. The temperature was raised up to 140° C. A reaction was carried out with stirring at 140° C. over a period of 2 hours.

The solid product which was thus treated with TiCl$_4$ was filtrated; washed 5 times with 100 ml of hexane; and vacuum dried at normal temperature to obtain a titanium supporting catalytic component. The titanium content of the catalytic component thus obtained was 6.86 wt. %.

Polymerization (d)

Polymerization of propylene was carried out in the same manner as in Polimerization (a) of Examples 1-3 and Comparison Examples 1-6 with the exception of that 0.5 ml of triethyl aluminum which was used as an organo-aluminum compound in the Polymerization (a) of Examples 1-3 and Comparison Examples 1-6 was replaced, in this case, with 0.3 ml of triethyl aluminum and 0.5 ml of diethyl aluminum chloride. The results of polymerization thus carried out were as shown in Table 2. Further, the bulk density of a solid polymer thus obtained was 0.371 g/ml.

EXAMPLE 6

A titanium supporting catalytic component was prepared in exactly the same manner as in Example 4 with the exception of that, in place of n-butyl ethyl magnesium which was used in Example 4, di-n-hexyl magnesium was used in this case. The composition of the titanium supporting catalytic component was analyzed to find that the titanium content thereof was 7.91 wt. %.

Polymerization of propylene was carried out in accordance with the method of Polymerization (c) in Example 4 with the above stated titanium supporting catalytic component used for polymerization. The results of this were as shown in Table 2.

EXAMPLE 7

161 ml of a heptane solution of di-n-hexyl magnesium (0.65 mol/liter) was put in a four-necked flask of content volume 300 ml. The temperature of the solution was cooled down to 0° C. When the temperature reached 0° C., 2.0 ml of ethyl benzoate was gradually added to the solution by dropping with stirring.

Following this, 75 ml of heptane having 25.2 ml of carbon tetrachloride dissolved therein was dropped into the flask with stirring at 0° C. After dropping, the temperature of the solution was allowed to rise up to room temperature and then was kept at room temperature for a period of 1.5 hours. Following this, the temperature of the solution was raised up to 80° C. The solution was stirred at that temperature for ripening over a period of 2 hours to obtain a solid product. The solid product thus obtained was isolated by filtration; washed 5 times with 100 ml of hexane; and vacuum dried at normal temperature to obtain a support.

Then, 5 g of this support was put in a four-necked flask of 300 ml and was arranged to be suspended in 100 ml of heptane. To this was added by dropping 100 ml of heptane containing 2.5 g of p-cresol. After dropping, the temperature of the contents of the flask was raised up to 80° C. Then, a reaction was allowed to proceed at 80° C. over a period of 2 hours with a stirring operation continuously carried out. The solid product which was thus treated with p-cresol was isolated through filtration; washed 5 times with 100 ml of hexane; and then vacuum dried at normal temperature to obtain a phenol compound treated solid product. Following this, the phenol compound treated solid product was put in a four-necked flask of 300 ml and was arranged to be suspended in 100 ml of heptane there. Then, 100 ml of hexane containing 6 g of triethyl aluminum was dropped into the flask at room temperature. A reaction was thus allowed to proceed over a period of 2 hours at room temperature. The solid product thus treated was isolated through filtration; washed 5 times with 100 ml of hexane; and vacuum dried at room temperature to obtain an organo-aluminum compound treated solid product. The treated product was put in a four-necked flask of 100 ml. Then, 80 ml of TiCl$_4$ was added. Treatment was carried out with stirring at 140° C. over a period of 2 hours. The solid product thus treated was isolated through filtration; washed 5 times with 100 ml of hexane; and vacuum dried at room temperature to obtain a titanium supporting catalytic component.

The composition of the catalytic component thus obtained was analyzed to find that the titanium content thereof was 6.44 wt. %.

Polymerization of propylene was carried out using this supported catalytic component in accordance with the method of Polymerization (c) described in the foregoing. The results of the polymerization were as shown in Table 2.

TABLE 2

| Example and Comparison Example No. | | P (g pp. g cata) | H.I. (%) | I.I. (%) |
|---|---|---|---|---|
| Example 1 | Polymerization (a) | 379 | 95.9 | 92.3 |
| Example 1 | Polymerization (b) | 714 | 95.2 | 92.9 |
| Comparison Example 1 | Polymerization (a) | 68 | 92.5 | 82.4 |
| Comparison Example 2 | Polymerization (a) | 98 | 89.3 | 80.2 |
| Comparison Example 3 | Polymerization (a) | 78 | 93.5 | 84.7 |
| Comparison Example 4 | Polymerization (a) | 102 | 94.8 | 88.1 |
| Comparison Example 5 | Polymerization (a) | 217 | 89.5 | 68.0 |
| Comparison Example 6 | Polymerization (a) | 243 | 88.8 | 83.9 |
| Example 2 | Polymerization (a) | 364 | 96.1 | 92.2 |
| Example 2 | Polymerization (b) | 705 | 95.8 | 92.4 |
| Example 3 | Polymerization (a) | 385 | 95.4 | 92.4 |
| Example 3 | Polymerization (b) | 720 | 95.3 | 92.5 |
| Example 4 | Polymerization (c) | 1286 | 96.6 | 93.6 |
| Comparison Example 7 | Polymerization (c) | 137 | 95.3 | 87.2 |
| Comparison Example 8 | Polymerization (c) | Trace | — | — |
| Example 5 | Polymerization (d) | 931 | 97.9 | 94.9 |
| Example 6 | Polymerization (c) | 1330 | 97.0 | 93.0 |
| Example 7 | Polymerization (c) | 1060 | 97.4 | 93.2 |

COMPARISON EXAMPLE 9

Using a vibration mill of 1.2 liter content volume containing 4.5 kg of steel balls each measuring ½ inch in diameter, 20 g of anhydrous magnesium chloride, 4.9 g of ethyl benzoate and 3 ml of silicone oil (Shinetsu Silicone KF-9b 100 cs, manufactured by SHINETSU KAGAKU) were put in the vibration mill. Pulverization was carried out over a period of 8 hours in a nitrogen atmosphere. A pulverized mixture was obtained. Then, 5 g of the pulverized mixture was put in a four-necked flask of 300 ml content volume and was arranged to be suspended in 100 ml of heptane there. Following this, 100 ml of heptane having 2.5 g of p-cresol dissolved therein was dropped into the flask at room temperature. After dropping, the flask was heated up to 80° C. and a reaction was allowed to proceed there at 80° C. over a period of 2 hours under a stirring operation. After that, 100 ml of heptane in which 6 g of triethyl aluminum was dissolved was dropped into the flask at room temperature. The mixture was stirred and mixed over a period of 2 hours at room temperature to obtain a treated matter. The treated matter was filtrated and washed 5 times with 100 ml of hexane.

The matter which was thus treated was put in a four-necked flask of 100 ml content volume and was arranged to be dispersed in 80 ml of TiCl₄ and was further treated at 140° C. over a period of 2 hours. The treated matter was separated by filtration; washed 5 times with 100 ml of hexane; and vacuum dried at room temperature to obtain a titanium supporting catalytic component.

The composition of the titanium supporting catalytic component was analyzed to find that the titanium content thereof was 2.54 wt. %.

COMPARISON EXAMPLE 10

The inside of a four-necked flask of 200 ml content volume was replaced with dry nitrogen. Then, n-butyl ethyl magnesium, triethyl aluminum and heptane were put in the flask in the ratio of 13.8 g, 1.9 g and 100 ml. They are allowed to react at 80° C. over a period of 2 hours to obtain an organo-magnesium complex. Then, while keeping the complex at a temperature of 50° C., a heptane solution of 1 mol/liter tert-butyl chloride was dropped to obtain a white solid matter, which was separated by filtration and washed 5 times with 100 ml of hexane.

Next, 2 g of the white solid matter thus obtained was arranged to be suspended in 30 ml of titanium tetrachloride. A reaction was allowed to proceed at 130° C. over a period of 2 hours under a stirring operation. A solid part of the reaction system thus obtained was isolated through filtration; washed 5 times with 100 ml of hexane; and vacuum dried at room temperature to obtain a titanium supporting catalytic component.

The composition of the catalytic component thus obtained was analyzed to find that the titanium content of the catalytic component was 1.5 wt. %.

COMPARISON EXAMPLE 11

Preparation of the Titanium Supporting Catalytic Component

A n-heptane solution, 161 ml, of n-butyl ethyl magnesium, whose concentration was 0.652 ml/l, was put into a four necked flask of volume being 500 ml, and the temperature of the solution was adjusted to 80° C. When the temperature thereof reached 80° C., 100 ml of n-heptane solution dissolving 25.2 ml of carbon tetrachloride therein, which had been charged into a dropping funnel, was added dropwise into the flask under stirring.

After adding dropwise thereof, the solution was subjected to ageing for further 2 hours at 80° C. under stirring.

A resultant solid product was filtered while it was hot, and was washed 5 times with 100 ml of hexane. Following this, it was dried in vacuum at normal temperature to give magnesium chloride.

The obtained magnesium chloride, 5 g, was put into a four necked flask of volume being 500 ml and was suspended in 200 ml of n-heptane.

The temperature of the suspension was raised to 80° C. Then, 2.0 ml of ethyl benzoate was slowly added dropwise thereto and, after adding dropwise thereof, it was subjected to the reaction for further 2 hours at 80° C. under stirring. After completion of the reaction, the suspension was filtered and the obtained solid was again suspended in 200 ml of n-heptane placed in a four necked flask of volume being 500 ml. To the suspension, 100 ml of n-heptane solution containing 2.5 g of phenol compound was added dropwise at 80° C. under stirring.

After adding dropwise thereof, it was subjected to the reaction for further 2 hours at 80° C. under stirring. Following this, the solid product treated with phenol compound was filtered, washed 5 times with 100 ml of n-hexane and thereafter was dried in vacuum at normal temperature to obtain a phenol compound treated solid. The whole amount of the treated solid was put into a four necked flask of volume being 500 ml and was suspended in 200 ml of n-heptane. Then, the temperature of the suspension was raised to 80° C.

After charging 100 ml of n-heptane solution dissolving 30 ml of TiCl₄ therein into a dropping funnel, the solution of TiCl₄ was added dropwise thereto at 80° C. under stirring.

After adding dropwise thereof, it was subjected to the reaction for further 2 hours at 80° C.

The TiCl₄ treated solid product was filtered while it was hot, and it was washed 5 times with 100 ml of n-hexane and was dried in vacuum at normal temperature to give the titanium supporting catalytic component. The titanium content in the titanium supporting catalytic component was 2.46 wt. %.

Polymerization Process

According to the polymerization (a) of Examples 1–3, polymerization of propylene was carried out. The results were P=247, H.I.=88.7 and I.I.=82.9.

COMPARATIVE EXAMPLE 12

Except that using anhydrous magnesium chloride on the market, which was pulverized, instead of magnesium chloride which was obtained by reacting n-butyl ethyl magnesium with carbon tetrachloride, the titanium supporting catalytic component was prepared and polymerization of propylene was carried out in the quite same way as the comparison example 11.

As the result, the titanium content in the supporting catalytic component was 1.51 wt. % and the results of polymerizing propylene were P=109, H.I.=92.1 and I.I.=90.4.

What is claimed is:

1. A catalytic component for polymerization of an α-olefin, said catalytic component being prepared by the following steps:
   (1) reacting an organic acid ester with an organo-magnesium compound expressed by a general formula RMgR', wherein R and R' represent the same or different hydrocarbon radicals having 1–10 carbon atoms;
   (2) reacting the product of step (1) with carbon tetrahalide;
   (3) treating the resultant product from step (2) with a phenol compound; and
   (4) treating the product from step (3) with a titanium compound containing halogen.

2. A catalytic component for polymerization of an α-olefin according to claim 1, wherein steps (1)–(4) for forming said catalytic component for polymerization of an α-olefin are carried out in an inert organic solvent.

3. A catalytic component for polymerization of an α-olefin according to claim 2, wherein the concentration of said organo-magnesium compound in said inert organic solvent is within a range from 0.01 to 50 wt. %.

4. A catalytic component for polymerization of an α-olefin according to claim 1, wherein the quantity of said organic acid ester is 0.01 to 1 mol for 1 mol of said organo-magnesium compound.

5. A catalytic component for polymerization of an α-olefin according to claim 1, wherein the quantity in which said carbon tetrahalide is mixed with said organo-magnesium compound is 0.01 to 10 mol for 1 mol of the hydrocarbon group of said organo-magnesium compound.

6. A catalytic component for polymerization of an α-olefin according to claim 1, wherein the reaction of step 2 for forming said catalytic component for polymerization of an α-olefin is carried out at a temperature between −50° and 100° C.

7. A catalytic component for polymerization of an α-olefin according to claim 1, wherein said phenol compound is used in quantity 0.01 to 10 mol per magnesium atom of said solid product obtained through the reaction of said organo-magnesium compound and said carbon tetrahalide.

8. A catalytic component for polymerization of an α-olefin according to claim 1, wherein titanium tetrahalide is used as said halogen containing titanium compound.

9. A catalytic component for polymerization of an α-olefin according to claim 8, wherein said titanium tetrahalide is used in quantity at least 0.01 mol for 1 mol of magnesium in the matter to be treated with the titanium tetrahalide.

10. A catalytic component for polymerization of an α-olefin according to claim 1, wherein said phenol compound is selected from the group consisting of phenol, cresol, chloro phenol, bromo phenol, 2,4,6-trichloro phenol, 2,4,6-tribromo phenol, nitro phenol, 2,4-dinitro phenol, guaiacol, anol, eugenol, isoeugenol, saligenin, carvacrol, thymol, hydroxyacetophenone, hydroxydiphenyl, cyclohexyl phenol, catechol, resorcinol, hydroquinone, phloroglucinol and amino phenol.

11. A catalytic component for polymerization of an α-olefin according to claim 2, wherein the quantity of said organic acid ester is 0.01 to 1 mol for 1 mol of said organo-magnesium compound.

12. A catalytic component for polymerization of α-olefin according to claim 3, wherein the quantity of said organic acid ester is 0.01 to 1 mol for 1 mol of said organo-magnesium compound.

13. A catalytic component for polymerization of an α-olefin according to claim 2, wherein the quantity in which said carbon tetrahalide is mixed with said organo-magnesium compound is 0.01 to 10 mol for 1 mol of the hydrocarbon group of said organo-magnesium compound.

14. A catalytic component for polymerization of an α-olefin according to claim 2, wherein the reaction of step 2 for forming said catalytic component for polymerization of an α-olefin is carried out at a temperature between −50° and 100° C.

15. A catalytic component for polymerization of an α-olefin according to claim 3, wherein said phenol compound is used in quantity 0.01 to 10 mol per magnesium atom of said solid product obtained through the reaction of said organo-magnesium compound and said carbon tetrahalide.

16. A catalytic component for polymerization of an α-olefin according to claim 2, wherein the reaction of step 2 for forming said catalytic component for polymerization of an α-olefin is carried out at a temperature between −50° and 100° C.

17. A catalytic component for polymerization of an α-olefin according to claim 2, wherein said phenol compound is used in quantity 0.01 to 10 mol per magnesium atom of said solid product obtained through the reaction of said organo-magnesium compound and said carbon tetrahalide.

18. A catalytic component for polymerization of an α-olefin according to claim 2, wherein titanium tetrahalide is used as said halogen containing titanium compound.

19. A catalytic component for polymerization of an α-olefin according to claim 3, wherein titanium tetrahalide is used as said halogen containing titanium compound.

* * * * *